(12) United States Patent  
Kim

(10) Patent No.: US 7,519,126 B2  
(45) Date of Patent: Apr. 14, 2009

(54) SPACE-TIME BLOCK-CODING (STBC) WITH MULTIPLE STREAMS IN ORHOGONAL FREQUENCY DIVISION MULITPLEXING (OFDM) FOR WIRELESS LOCAL AREA NETWORKS (WLAN) AND ERROR METRICS FOR SOFT DECISION WITH CHANNEL INFORMATION

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 769 days.

(21) Appl. No.: 10/953,366

(22) Filed: Sep. 30, 2004

(65) Prior Publication Data

US 2005/0281348 A1 Dec. 22, 2005

Related U.S. Application Data

(60) Provisional application No. 60/579,670, filed on Jun. 16, 2004.

(51) Int. Cl.  
*H04B 7/02* (2006.01)

(52) U.S. Cl. ............ 375/267; 375/299; 375/347; 455/101; 455/296; 455/132

(58) Field of Classification Search ........ 375/267, 375/299, 347; 455/101, 132, 296  
See application file for complete search history.

(56) References Cited

U.S. PATENT DOCUMENTS 7,231,577 B2 * 6/2007 Richardson et al. ......... 714/758

| 2001/0053143 A1 * | 12/2001 | Li et al. ............... 370/344 |
| 2002/0196844 A1 * | 12/2002 | Rafie et al. ........... 375/232 |
| 2004/0081074 A1 * | 4/2004 | Piechocki ............. 370/206 |
| 2004/0132416 A1 * | 7/2004 | Yee ..................... 455/82 |
| 2006/0050804 A1 * | 3/2006 | Leclair ................ 375/267 |
| 2006/0056280 A1 * | 3/2006 | Ido et al. .............. 370/208 |

OTHER PUBLICATIONS

Sugiyama, "Development of a novel SDM-COFDM prototype for broadband wireless access systems", WCNC 2003, 2003 IEEE Wireless Communications and Networking, 2003, vol. 1, 20-20 Mar. 2003 pp. 55-60 vol. 1.*

González-López, "Space-time receivers for GSM radio interfaces in subway tunnel environments", IEEE Wireless Communications and Mobile Computing vol. 2 Issue 7, pp. 719-733, Published Online: Nov. 22, 2002.*

Jianzhong Zhang, "Space-time MIMO receiver with constrained optimization", 2003 IEEE 58th Vehicular Technology Conference, 2003, VTC 2003-Fall, vol. 1, Oct. 6-9, 2003 pp. 532-536 vol. 1.*

(Continued)

*Primary Examiner*—Juan A Torres

(57) ABSTRACT

A method of receiving data over N receiving antennas from M transmitting antennas, where M and N are integers, includes the steps of receiving N signals over the N receiving antennas, applying the N signals to a space/time decoder, determining noise powers for N channels, with the N channels being based on the N signals, applying Viterbi filtering to the N channels utilizing the noise powers and deriving received data from the filtered N channels.

26 Claims, 13 Drawing Sheets

OTHER PUBLICATIONS

Donny Jackson, Telephony, Ultrawideband May Thwart 802.11, Bluetooth Efforts, Primedia Business Magazines & Media Inc., Feb. 11, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi-Fi: Friends or foes?", Network World Mobile Newsletter, Network World, Inc., Jun. 18, 2001.

Joel Conover, "Anatomy of IEEE 802.11b Wireless," NetworkComputing.com, Aug 7, 2000.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffworks, Inc., www.howstuffworks.com/wireless-network.htm/printable, Aug. 15, 2002.

"Simple 802.11b Wireless Ethernet Network with an Access Point," HomeNetHelp.com, Anomaly, Inc., www.homenethelp.com/web/diagram/access-point.asp, Aug. 20, 2002.

"Bridging a Wireless 802.11b Network with a Wired Ethernet Network" HomeNetHelp.com, Anomaly, Inc., www.homenethelp.com/web/diagram/wireless-bridged.asp, Aug. 20, 2002.

"Wireless Access Point (802.11b) of the Router Variety," HomeNetHelp.com, Anomaly, Inc., www.homenethelp.com/web/diagram/share-wireless-ap.asp, Aug. 20, 2002.

David G. Leeper, "Wireless Data Blaster," ScientificAmerican.com, Scientific American, Inc., May 4, 2002.

Jim Zyren and Al Petrick, "Brief Tutorial on IEEE 802.11 Wireless LANs," AN9829, Intersil Corporation, Feb. 1999.

Waleed M. Younis, Student Member, IEEE, Ali H. Sayed, Fellow, IEEE, and Naofal Al-Dhahir, Senior Member, IEEE, "Efficient Adaptive Receivers for Joint Equalization and Interference Cancellatino in Multiuser Space-Time Block-Coded Systems," IEEE Transactions on Signal Processing, vol. 51, No. 11, Nov. 2003.

Syman F. Naguib, Nambi Seshadri and A.R. Calderbank, IEEE, Signal Processing Magazine, May 2000, pp. 72-92 Title: "Increasing data rate over wireless channels: Space time coding and signal processing for high data rate wireless communications".

\* cited by examiner

SPACE-TIME BLOCK-CODING (STBC) WITH MULTIPLE STREAMS IN ORHOGONAL FREQUENCY DIVISION MULITPLEXING (OFDM) FOR WIRELESS LOCAL AREA NETWORKS (WLAN) AND ERROR METRICS FOR SOFT DECISION WITH CHANNEL INFORMATION

REFERENCE TO RELATED APPLICATIONS

This application claims priority of U.S. Provisional Patent Application Ser. No. 60/579,670, filed on Jun. 16, 2004. The subject matter of this earlier filed application is hereby incorporated by reference.

BACKGROUND OF THE INVENTION

1. Field of Invention

The present invention relates to wireless communication between devices. In particular, the present invention is directed to coding techniques applicable to orthogonal frequency division multiplexing (OFDM) in wireless networking.

2. Description of Related Art

In recent years, there has been rapid growth in mobile computing and other wireless data services, as well as growth in fixed wireless access technologies. These services have the benefit of not requiring wiring between nodes to support the networking and potentially allow for communication where it could be difficult to provide a wired infrastructure. These services can be used to provide high quality telephony, high-speed Internet access, multimedia and other broadband services.

These services provide several challenges in the areas of efficient coding and modulation, quality improving signal processing techniques and techniques for sharing limited spectrum between users. One way to improve the capacity of wireless communication systems is to use multiple transmit and receive antennas. This is often achieved through coding techniques appropriate to multiple antennas, such as through space-time block-coding (STBC).

STBC is a coding technique used with multiple antennas to introduce temporal and spatial correlation into signals transmitted from different antennas, in order to provide diversity at a receiver, and coding gain when compared to an uncoded system, without sacrificing bandwidth. STBC helps increase reliability and can provide full diversity gains with simple linear processing of signals at a receiver.

The wireless channels used are subject to time-varying problems such as noise, interference and multipath issues. Additionally, for mobile systems, the communications should be accomplished through low power requirements so that the system can be simply powered and remain small and lightweight. This can often preclude signal processing techniques that can be used for reliable communications and efficient spectral utilization, if those techniques demand significant processing power.

As discussed above, when the resources of multiple antennas are available, the spatial domain can be utilized to achieve reliable transmission. In that case, some pairs of antennas are used for diversity gains and some groups used with multiplexing for higher throughputs. With these multiple streams, there is a need for interference cancellation at the receiver. However, the prior art does not provide such interference cancellation techniques for multiple streams. Additionally, because STBC is performed in the raw-data space, papers published never discuss coding/decoding techniques. However, if the noise in the signals is colored or is hard to estimate, it is not possible to provide soft decision processes in a Viterbi decoder. Thus, there is a need in the prior art for a means to estimate noise power in STBC, with or without multiplexing, and applicable to Viterbi decoding.

SUMMARY OF THE INVENTION

According to one embodiment of the invention, a method of receiving data over M receiving antennas from N transmitting antennas is disclosed, where M and N are integers. The method includes the steps of receiving M signals over the M receiving antennas, applying the M signals to a space/time decoder, determining noise powers for M channels, with the M channels being based on the M signals, applying Viterbi filtering to the M channels utilizing the noise powers and deriving received data from the filtered M channels.

Additionally, the step of determining noise powers may include removing interference terms between the M channels. Also, the step of determining noise powers may include zero-forcing terms equivalent to relationships between signals sent from the N transmitting antennas to the M receiving antennas to determine channel information. The relationship may be:

$$\begin{bmatrix} r_1 \\ r_2 \end{bmatrix} = \begin{bmatrix} H_1 & G_1 \\ H_2 & G_2 \end{bmatrix} \begin{bmatrix} c_1 \\ c_2 \end{bmatrix} + \begin{bmatrix} n_1 \\ n_2 \end{bmatrix} \quad \text{where,}$$

$$c_1 = \begin{bmatrix} c_{11} \\ c_{12} \end{bmatrix}, \quad c_2 = \begin{bmatrix} c_{21} \\ c_{22} \end{bmatrix}, \quad r_1 = \begin{bmatrix} r_1(t_1) \\ r_1^*(t_2) \end{bmatrix}, \quad r_2 = \begin{bmatrix} r_2(t_1) \\ r_2^*(t_2) \end{bmatrix},$$

$$H_i = \begin{bmatrix} h_{1i} & h_{2i} \\ h_{2i}^* & -h_{1i}^* \end{bmatrix}, \quad G_i = \begin{bmatrix} h_{3i} & h_{4i} \\ h_{4i}^* & -h_{3i}^* \end{bmatrix}$$

and the channel information of each STBC symbol after crosstalk cancellation, Ni, comprises:

$$E\left(\begin{bmatrix} N_1 \\ N_2 \end{bmatrix} [N_1^* \; N_2^*]\right) =$$

$$\begin{bmatrix} \tilde{H}^*(I+\hat{G})\tilde{H} & -\tilde{H}^*((H_2 H_1^{-1})^* + G_1 G_2^{-1})\tilde{H} \\ \tilde{G}^*(H_1 H_1^{-1} + (G_1 G_2^{-1})^*)\tilde{H} & \tilde{G}^*(I+\hat{H})\tilde{G} \end{bmatrix}$$

where, $\hat{G} = G_1(G_2^* G_2)^{-1} G_1^*, \quad \hat{H} = H_2(H_1^* H_1)^{-1} H_2^*.$ In addition, when M is greater than N, the channel information can be written as sums of weighted scalar values. Additionally, the step of receiving M signals may include receiving the M signals that have been coded through space-time block-coding. Also, the step of applying Viterbi filtering to the M channels may include applying soft decision Viterbi filtering to the M channels. The method may also include the steps of band pass filtering of the M received signals, analog-to-digital converting of the M received signals, fast Fourier transforming the M Viterbi filtered channels and multiplexing the M Viterbi filtered channels.

According to another embodiment, a receiver for receiving data over M receiving antennas transmitted from N transmitting antennas, where M and N are integers, is disclosed. The receiver includes receiving means for receiving M signals over the M receiving antennas, applying means for applying the M signals to a space/time decoder, determining means for determining noise powers for M channels, with the M channels being based on the M signals, filtering means for applying Viterbi filtering to the M channels utilizing the noise powers and deriving means for deriving received data from the filtered M channels.

According to another embodiment, a receiver for receiving data over M receiving antennas transmitted from N transmitting antennas, where M and N are integers, is disclosed. The receiver includes M receiving antennas, configured to receive M signals, a space/time decoder, configured to receive the M signals and supply M channels being based on the M signals and a multiplexer, configured to provide received data from the M channels. The space/time decoder is configured to determine noise powers for M channels and to apply Viterbi filtering to the M channels utilizing the noise powers.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

STBC is usually performed in raw symbol domains. When soft decision processes are applied with some channel information from STBC process, a greater coding gain, in addition to transmission diversity gain, from STBC is obtained. This is because a coding gain depends on signal quality. Good coding gain cannot be obtained on signals with poor quality, better coding gain may be obtained on signals with better quality to correct poor quality signals. Since STBC needs a flat channel response, orthogonal frequency division multiplexing (OFDM) is used for frequency selective channels. It is noted that STBC with OFDM is considered for IEEE 802.11n standards with multiple antennas for reliable transmission.

As an example of the techniques employed by the present invention, the following system is considered, $$\begin{bmatrix} r_1 \\ r_2 \end{bmatrix} = \begin{bmatrix} H_1 & G_1 \\ H_2 & G_2 \end{bmatrix} \begin{bmatrix} c_1 \\ c_2 \end{bmatrix} + \begin{bmatrix} n_1 \\ n_2 \end{bmatrix} \quad (1)$$

where, $$c_1 = \begin{bmatrix} c_{11} \\ c_{12} \end{bmatrix}, \quad c_2 = \begin{bmatrix} c_{21} \\ c_{22} \end{bmatrix}, \quad r_1 = \begin{bmatrix} r_1(t_1) \\ r_1^*(t_2) \end{bmatrix}, \quad r_2 = \begin{bmatrix} r_2(t_1) \\ r_2^*(t_2) \end{bmatrix}, \quad (2)$$

$$H_i = \begin{bmatrix} h_{1i} & h_{2i} \\ h_{2i}^* & -h_{1i}^* \end{bmatrix}, \quad G_i = \begin{bmatrix} h_{3i} & h_{4i} \\ h_{4i}^* & -h_{3i}^* \end{bmatrix}$$

Figure 1:
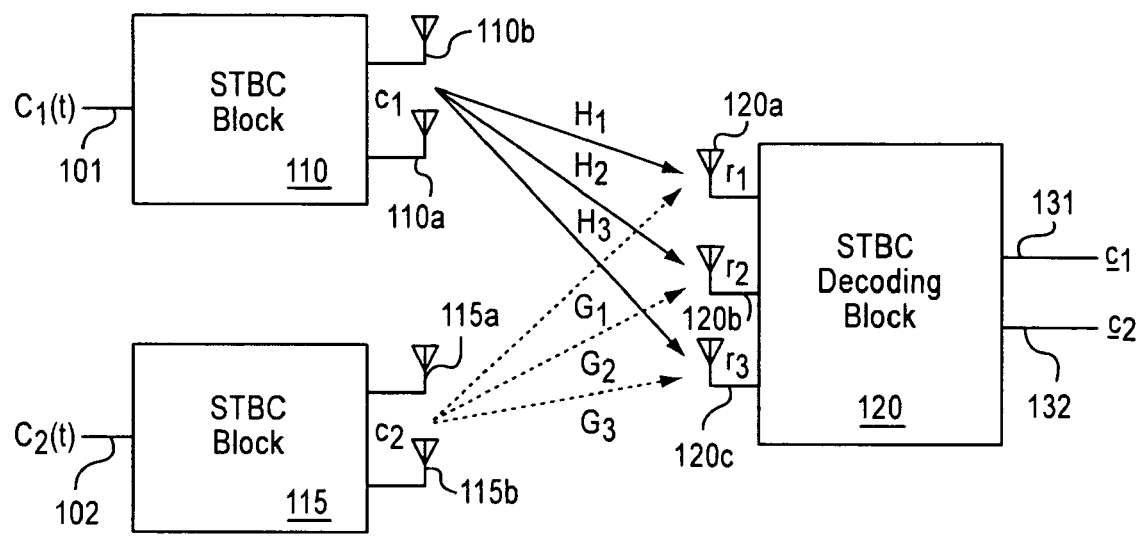
FIG. 1 provides a schematic illustrating multiple transmitters and a receiver having a multiplicity of antennas, according to one embodiment of the present invention.

The above elements may be further explained by reference to FIG. 1. In that figure, multiple signals, $c_1(t)$ and $c_2(t)$, are received from an encoding block at inputs 101 and 102, where 110 and 115 are STBC blocks. After coding, signal $c_1$ is transmitted through transmission antennas 110a and 110b, and signal $c_2$ is transmitted through transmission antennas 115a and 115b. The transmitted signals are received by the STBC decoding block 120, through receive antennas 120a, 120b and 102c. After processing, signals, $c_1$ and $c_2$, based on the originally transmitted signals are reformulated and output through outputs 131 and 132. In general, the received signal is related to the source signal through an "H" or "G" component plus a noise term.

Figure 2A:
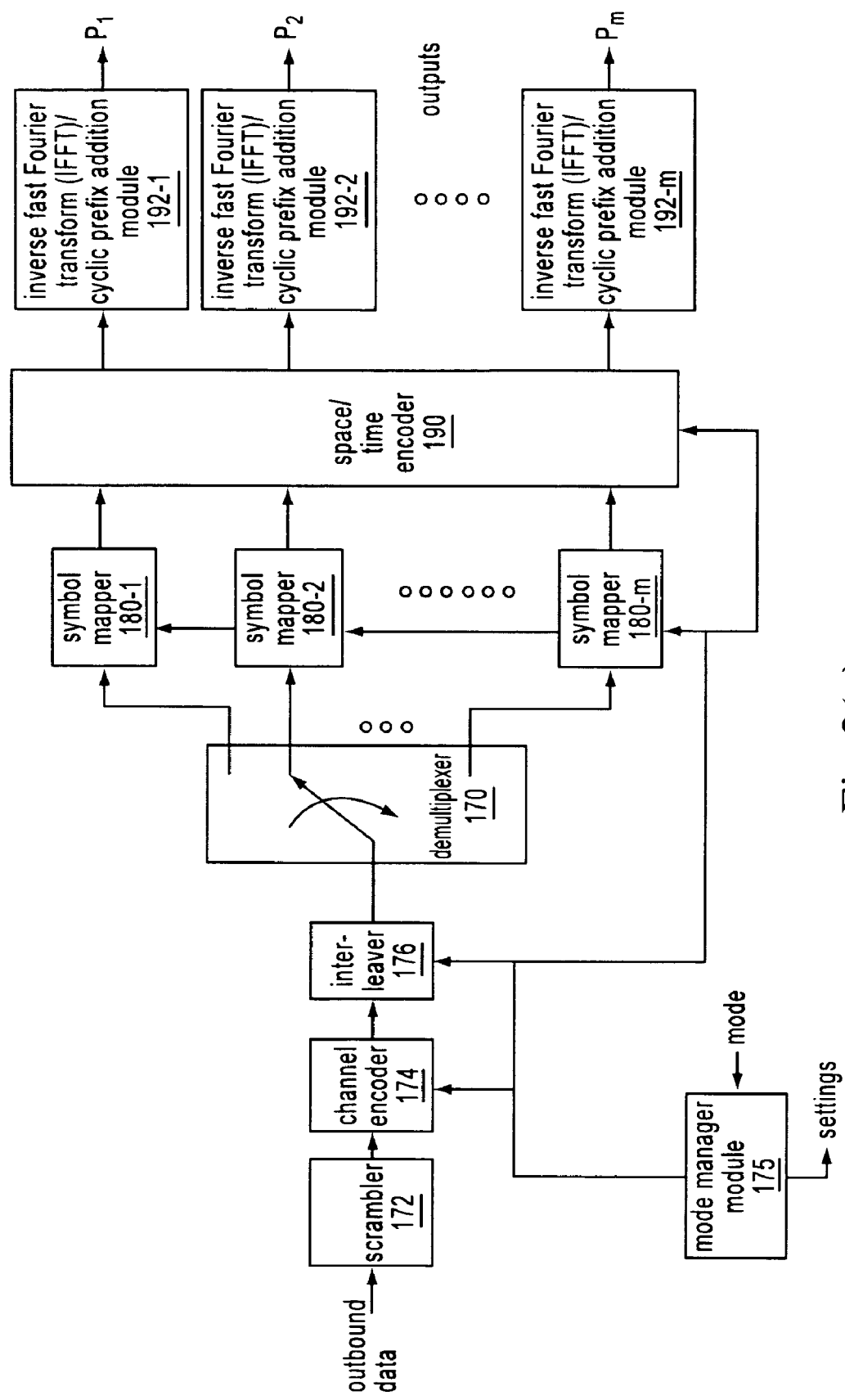
FIG. 2 illustrates a schematic of a transmitter circuit, with FIG. 2(a) illustrating modules that produce multiple signals and with FIG. 2(b) illustrating modules for manipulating the multiple signals, according to one embodiment of the present invention.

While the above receiver and transmitter are discussed and illustrated generally, more specific discussions of the receiver and transmitter may be necessary to understand the use of coding in wireless networking. FIGS. 2(a) and (b) illustrate a schematic block diagram of a multiple transmitter in accordance with one embodiment of the present invention. In FIG. 2(a), the baseband processing is shown to include a scrambler 172, channel encoder 174, interleaver 176, demultiplexer 170, a plurality of symbol mappers 180-1 through 180-m, a space/time encoder 190, and a plurality of inverse fast Fourier transform (IFFT)/cyclic prefix addition modules 192-1 through 192-m. It is noted that space/time encoder and the IFFT modules may be combined to have a module that performs both functions. The baseband portion of the transmitter may further include a mode manager module 175 that receives the mode selection signal and produces settings for the radio transmitter portion and produces the rate selection for the baseband portion.

In operations, the scrambler 172 adds (in GF2) a pseudo random sequence to the outbound data bits to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔rds and ¾ according to the specified rate tables. For backward compatibility with IEEE 802.11(b) and the CCK modes of IEEE 802.11(g), the channel encoder has the form of a CCK code as defined in IEEE 802.11(b).

For higher data rates, the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. As discussed below, the channel information can be derived, and can be used in the decoding process for both turbo and LDPC coding.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes, the interleaver will interleave data over multiple transmit streams. The demultiplexer 170 converts the serial interleave stream from interleaver 176 into M-parallel streams for transmission.

Each symbol mapper 180-1 through 180-$m$ receives a corresponding one of the M-parallel paths of data from the demultiplexer where m=M. Each symbol mapper 180-1 through 180-$m$ lock maps bit streams to quadrature amplitude modulated QAM symbols (e.g., BPSK, QPSK, 16 QAM, 64 QAM, 256 QAM, et cetera) according to the rate tables. For IEEE 802.11(a) backward compatibility, double gray coding may be used.

The map symbols produced by each of the symbol mappers 180-1 through 180-$m$ are provided to the space/time encoder 190 that receives the M-parallel paths of time domain symbols and converts them into output symbols. In one embodiment, the number of M-input paths will equal the number of P-output paths. In another embodiment, the number of output paths P will equal M+1 paths. For each of the paths, the space/time encoder multiples the input symbols with an encoding matrix that has the form of:

$$\begin{bmatrix} C_1 & C_2 & C_3 & \ldots & C_{2M-1} \\ -C_2^* & C_1^* & C_4 & \ldots & C_{2M} \end{bmatrix}$$

It is noted that the rows of the encoding matrix correspond to the number of input paths and the columns correspond to the number of output paths.

The outputs of the space/time encoder 190 are introduced into IFFT/cyclic prefix addition modules 192-1 through 192-$m$, which perform frequency domain to time domain conversions and add a prefix, which allows removal of inter-symbol interference at the receiver. It is noted that the length of the IFFT and cyclic prefix are defined in mode tables. In general, a 64-point IFFT will be used for 20 MHz channels and 128-point IFFT will be used for 40 MHz channels.

Figure 2B:
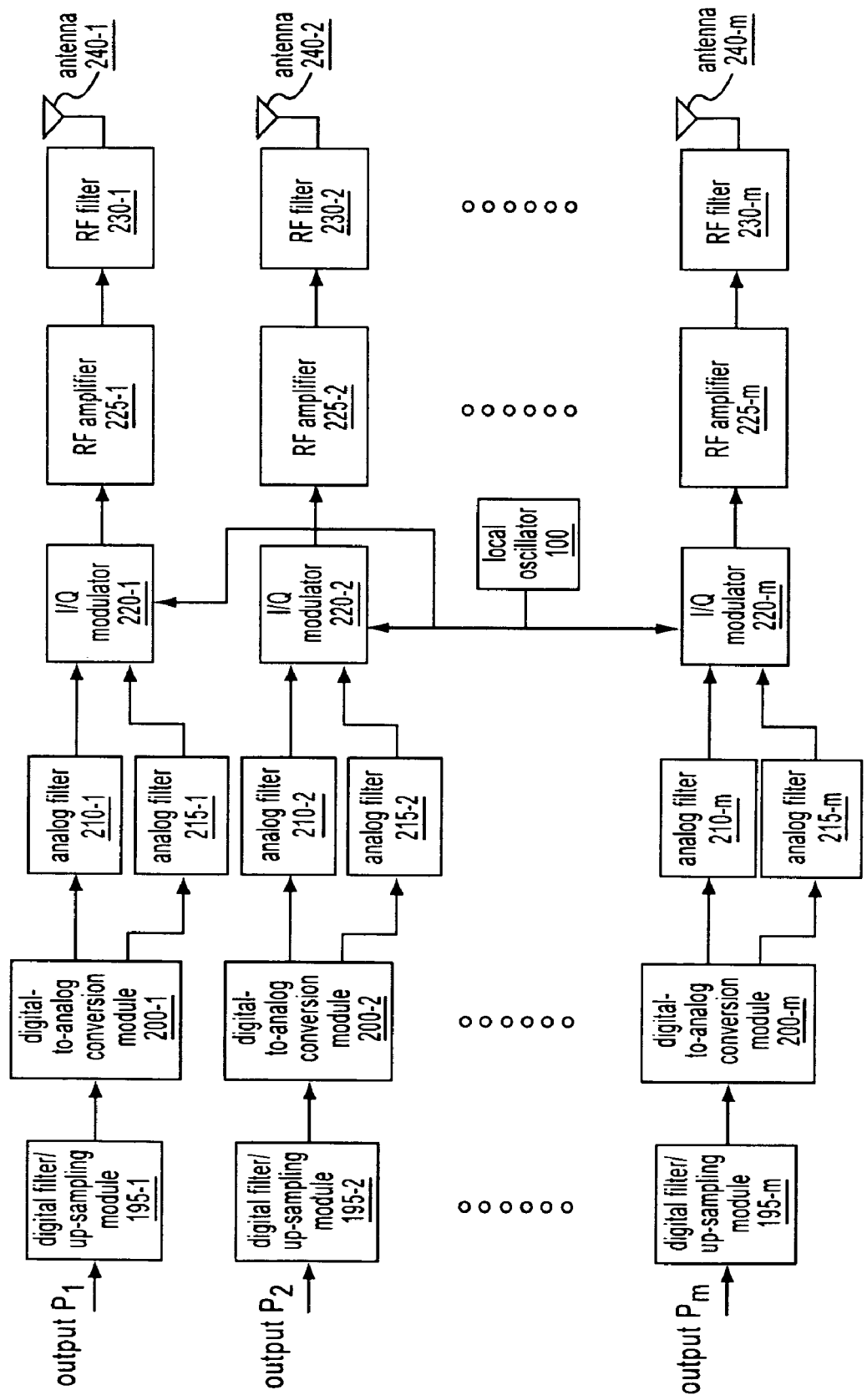

FIG. 2(b) illustrates the radio portion of the transmitter that includes a plurality of digital filter/up-sampling modules 195-1 through 195-$m$, digital-to-analog conversion modules 200-1 through 200-$m$, analog filters 210-1 through 210-$m$ and 215-1 through 215-$m$, I/Q modulators 220-1 through 220-$m$, RF amplifiers 225-1 through 225-$m$, RF filters 230-1 through 230-$m$ and antennas 240-1 through 240-$m$. The P-outputs from the space/time encoder 192-1 through 192-$m$ are received by respective digital filtering/up-sampling modules 195-1 through 195-$m$.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 195-1 through 195-$m$, filter the corresponding symbols and adjust the sampling rates to correspond with the desired sampling rates of the digital-to-analog conversion modules 200-1 through 200-$m$. The digital-to-analog conversion modules 200-1 through 200-$m$ convert the digital filtered and up-sampled signals into corresponding in-phase and quadrature analog signals. The analog filters 210-1 through 210-$m$ and 215-1 through 215-$m$ filter the corresponding in-phase and/or quadrature components of the analog signals, and provide the filtered signals to the corresponding I/Q modulators 220-1 through 220-$m$. The I/Q modulators 220-1 through 220-$m$, based on a local oscillation, which is produced by a local oscillator 100, up-converts the I/Q signals into radio frequency signals. The RF amplifiers 225-1 through 225-$m$ amplify the RF signals which are then subsequently filtered via RF filters 230-1 through 230-$m$ before being transmitted via antennas 240-1 through 240-$m$.

Figure 3A:
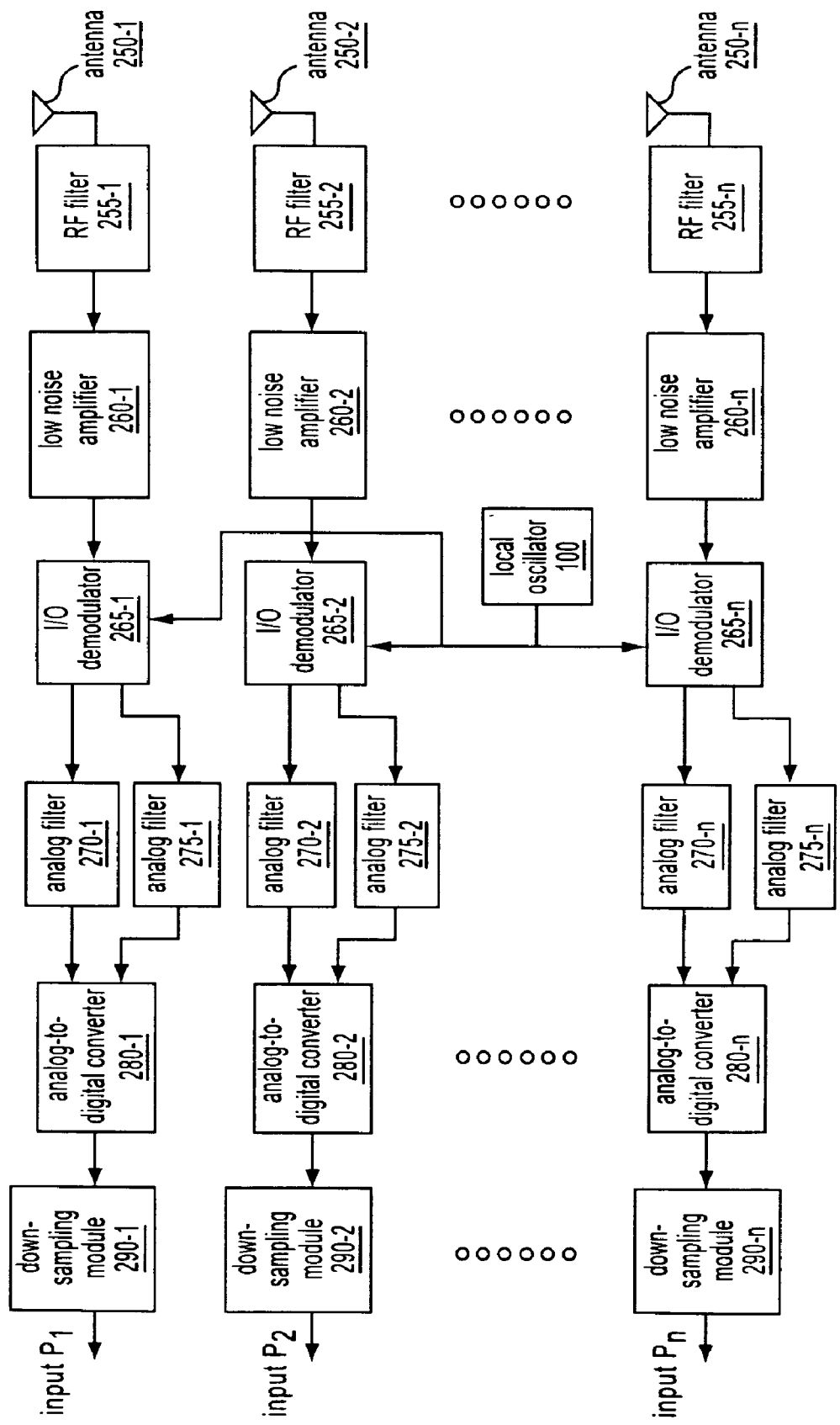
FIG. 3 illustrates a schematic of a receiver circuit, with FIG. 3(a) illustrating modules that receive multiple signals and with FIG. 3(b) illustrating modules for deriving original data from the multiple signals, according to one embodiment of the present invention.
Figure 3B:
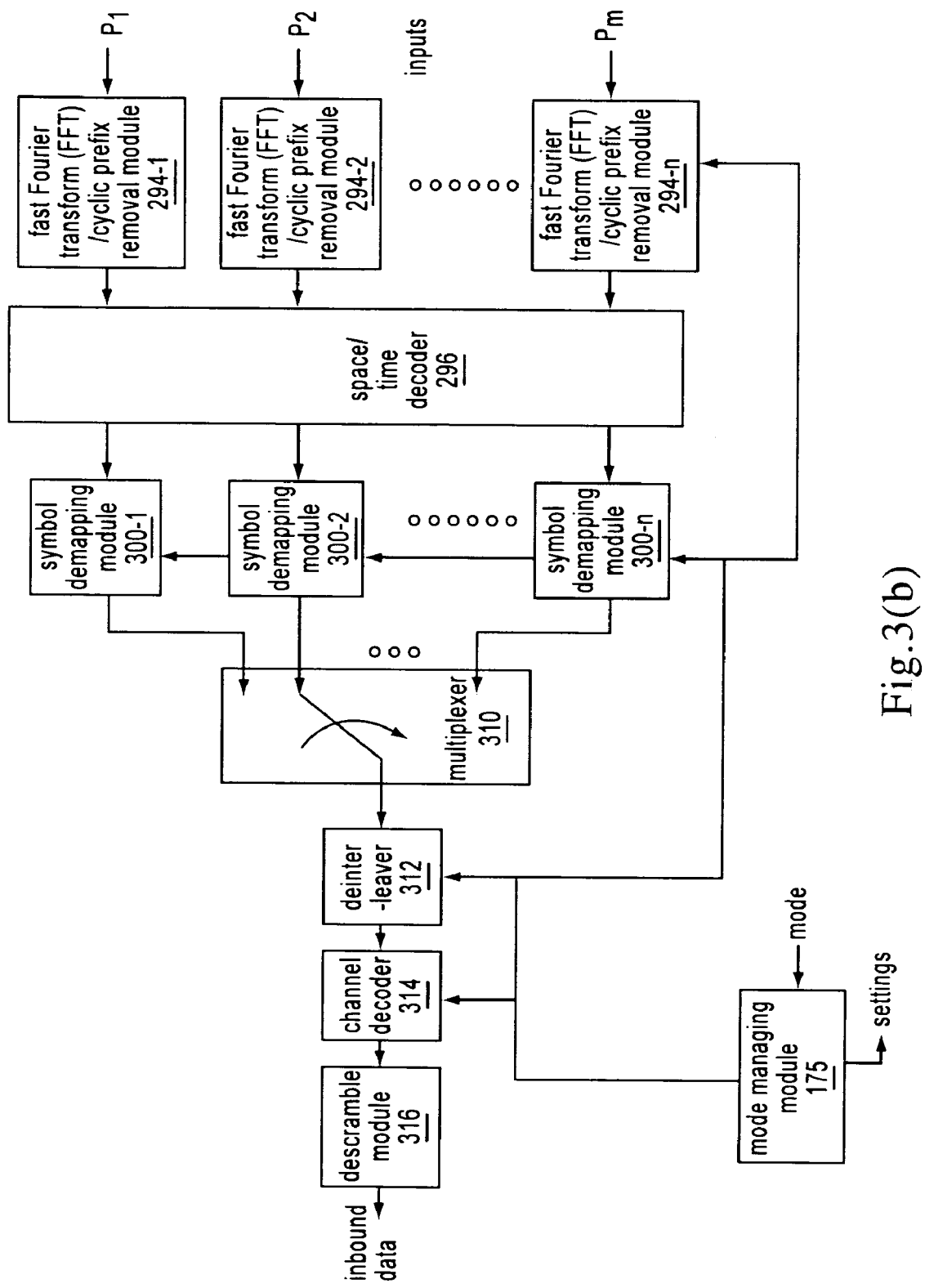

FIGS. 3(a) and 3(b) illustrate a schematic block diagram of another embodiment of a receiver in accordance with the present invention. FIG. 3(a) illustrates the analog portion of the receiver which includes a plurality of receiver paths. Each receiver path includes an antenna, 250-1 through 250-$n$, RF filters 255-1 through 255-$n$, low noise amplifiers 260-1 through 260-$n$, I/Q demodulators 265-1 through 265-$n$, analog filters 270-1 through 270-$n$ and 275-1 through 275-$n$, analog-to-digital converters 280-1 through 280-$n$ and digital filters and down-sampling modules 290-1 through 290-$n$.

In operation, the antennas 250-1 through 250-$n$ receive inbound RF signals, which are band-pass filtered via the RF filters 255-1 through 255-$n$. The corresponding low noise amplifiers 260-1 through 260-$n$ amplify the filtered signals and provide them to the corresponding I/Q demodulators 265-1 through 265-$n$. The I/Q demodulators 265-1 through 265-$n$, based on a local oscillation, which is produced by local oscillator 100, down-converts the RF signals into baseband in-phase and quadrature analog signals.

The corresponding analog filters 270-1 through 270-$n$ and 275-1 through 275-$n$ filter the in-phase and quadrature analog components, respectively. The analog-to-digital converters 280-1 through 280-$n$ convert the in-phase and quadrature analog signals into a digital signal. The digital filtering and down-sampling modules 290-1 through 290-$n$ filter the digital signals and adjust the sampling rate to correspond to the rate of the baseband processing, which will be described in FIG. 6B.

FIG. 3(b) illustrates the baseband processing of a receiver where n=N. The baseband processing includes a plurality of fast Fourier transform (FFT)/cyclic prefix removal modules 294-1 through 294-$n$, a space/time decoder 296, a plurality of symbol demapping modules 300-1 through 300-$n$, a multiplexer 310, a deinterleaver 312, a channel decoder 314, and a descramble module 316. The baseband processing module may further include a mode managing module 175. The N paths are processed via the FFT/cyclic prefix removal modules 294-1 through 294-$n$ which perform the inverse function of the IFFT/cyclic prefix addition modules 192-1 through 192-$m$ to produce frequency domain symbols. The space/time decoding module 296, which performs the inverse function of space/time encoder 190, receives P-inputs from the FFT/cyclic prefix removal modules and produce N-output paths.

The symbol demapping modules 300-1 through 300-$n$ convert the frequency domain symbols into data utilizing an inverse process of the symbol mappers 180. The multiplexer 310 combines the demapped symbol streams into a single path. The deinterleaver 312 deinterleaves the single path utilizing an inverse function of the function performed by interleaver 176. The deinterleaved data is then provided to the channel decoder 314 which performs the inverse function of channel encoder 174. The descrambler 316 receives the decoded data and performs the inverse function of scrambler 172 to produce the inbound data.

In order to better estimate a transmitted signal from the received signal, interference terms can be made to cancel. To cancel interference, Zero-Forcing is applied $$\begin{bmatrix} I & -G_1 G_2^{-1} \\ -H_2 H_1^{-1} & I \end{bmatrix} \begin{bmatrix} r_1 \\ r_2 \end{bmatrix} = \begin{bmatrix} \tilde{r}_1 \\ \tilde{r}_2 \end{bmatrix} = \begin{bmatrix} \tilde{H} & 0 \\ 0 & \tilde{G} \end{bmatrix} \begin{bmatrix} c_1 \\ c_2 \end{bmatrix} + \begin{bmatrix} \tilde{n}_1 \\ \tilde{n}_2 \end{bmatrix} \quad (3)$$

where, $\tilde{H} = H_1 - G_1 G_2^{-1} H_2$, $\tilde{G} = G_2 - H_2 H_1^{-1} G_1$.

When applying STBC on two sequency simultaneously, $$\begin{bmatrix} \tilde{H}^* & 0 \\ 0 & \tilde{G}^* \end{bmatrix} \begin{bmatrix} \tilde{r}_1 \\ \tilde{r}_2 \end{bmatrix} = \begin{bmatrix} \tilde{H}^* \tilde{H} & 0 \\ 0 & \tilde{G}^* \tilde{G} \end{bmatrix} \begin{bmatrix} c_1 \\ c_2 \end{bmatrix} + \begin{bmatrix} N_1 \\ N_2 \end{bmatrix} \quad (4)$$

where H*H and G*G are diagonal and Hermitian matrices.

STBC provides $c_1$ and $c_2$ after Zero-Forcing. To use a soft decision Viterbi decoder, channel information is needed. After Zero-Forcing, the signals will have unity gain and the noise power is needed for the channel information.

Since $N_1$ and $N_2$ are still Gaussian, the channel information can be written as:

$$E\left(\begin{bmatrix} N_1 \\ N_2 \end{bmatrix} \begin{bmatrix} N_1^* & N_2^* \end{bmatrix}\right) = \begin{bmatrix} \tilde{H}^* & 0 \\ 0 & \tilde{G}^* \end{bmatrix} \begin{bmatrix} I & -G_1 G_2^{-1} \\ -H_2 H_1^{-1} & I \end{bmatrix} \begin{bmatrix} I & -(H_1 H_1^{-1})^* \\ -(G_1 G_1^{-1})^* & I \end{bmatrix} \begin{bmatrix} \tilde{H} & 0 \\ 0 & \tilde{G} \end{bmatrix}$$

$$= \begin{bmatrix} \tilde{H}^*(I + \hat{G})\tilde{H} & -\tilde{H}^*((H_2 H_1^{-1})^* + G_1 G_2^{-1})\tilde{H} \\ \tilde{G}^*(H_1 H_1^{-1} + (G_1 G_2^{-1})^*)\tilde{H} & \tilde{G}^*(I + \hat{H})\tilde{G} \end{bmatrix}$$

where, $\hat{G} = G_1(G_2^* G_2)^{-1} G_1^*$, $\hat{H} = H_2(H_1^* H_1)^{-1} H_2^*$.

Thus, $E(N_1 N_1^*)$ and $E(N_2 N_2^*)$ can be used as channel information for soft decision in Viterbi decoder. When the system has M greater than N (i.e., is overdetermined), combinations can be used. (i.e., $_M C_2$), where M is equal to the number of receive antennas and N is equal to the number of transmit antenna pairs.

For M=3, there are 3 combinations, then noise power will be scaled as well, such that:

$$E(N_1 N_1^*) = w_{11} E(N_{11} N_{11}^*) + w_{21} E(N_{21} N_{21}^*) + w_{31} E(N_{31} N_{31}^*)$$

$$E(N_2 N_2^*) = w_{12} E(N_{12} N_{12}^*) + w_{22} E(N_{22} N_{22}^*) + w_{32} E(N_{32} N_{32}^*)$$

where $N_{ij}$ is the noise after ZF processing for each $i^{th}$ combination. The $w_{ij}$ values are weights on each summation and can be chosen to be equal or can be based on SNR values, signal-to-noise values, or based on SINR, signal-to-interference-and-noise values.

Figure 4:
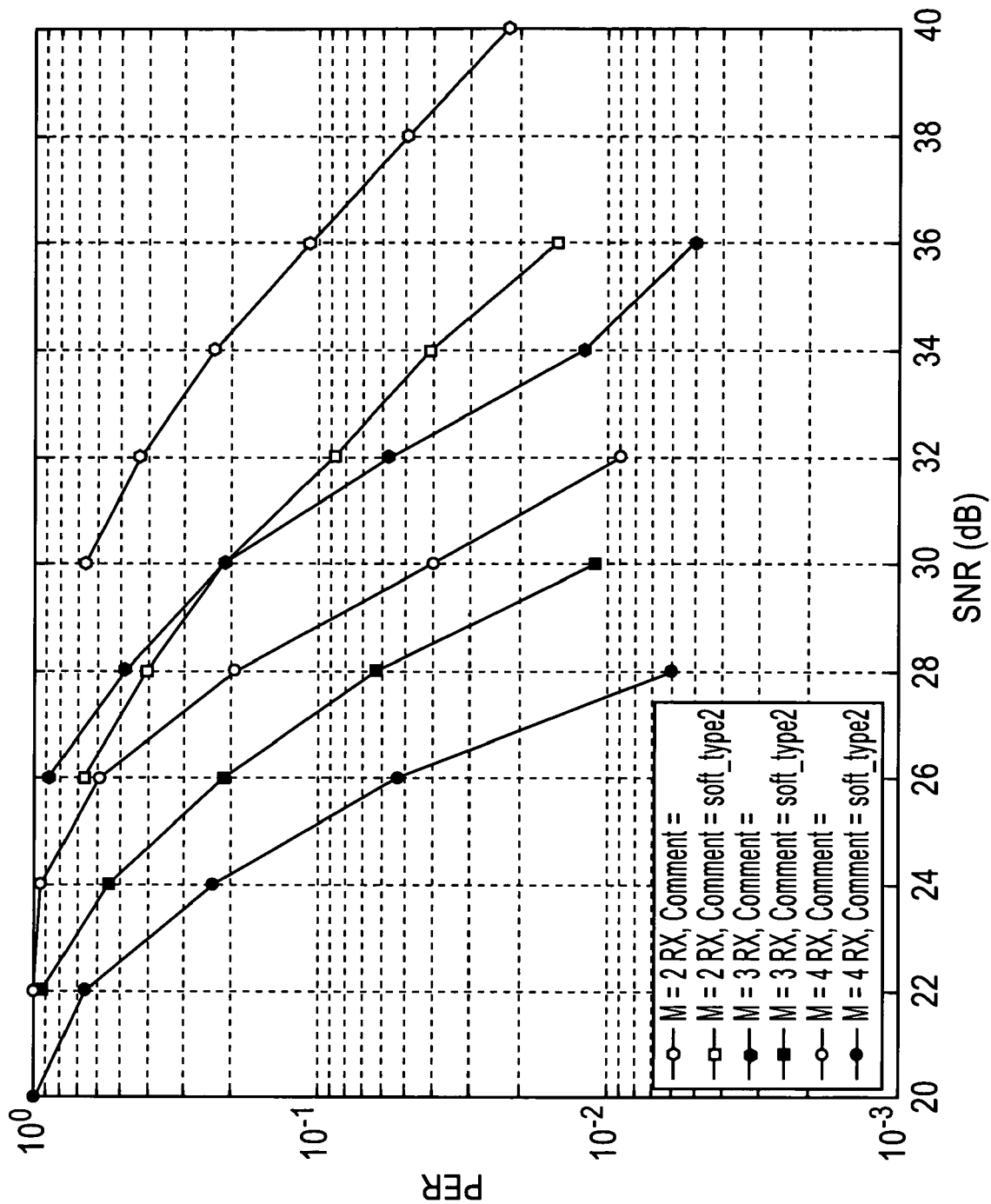
FIG. 4 provides simulation data showing differences between hard and soft decisions in STBC, according to one embodiment of the present invention.
Figure 5:
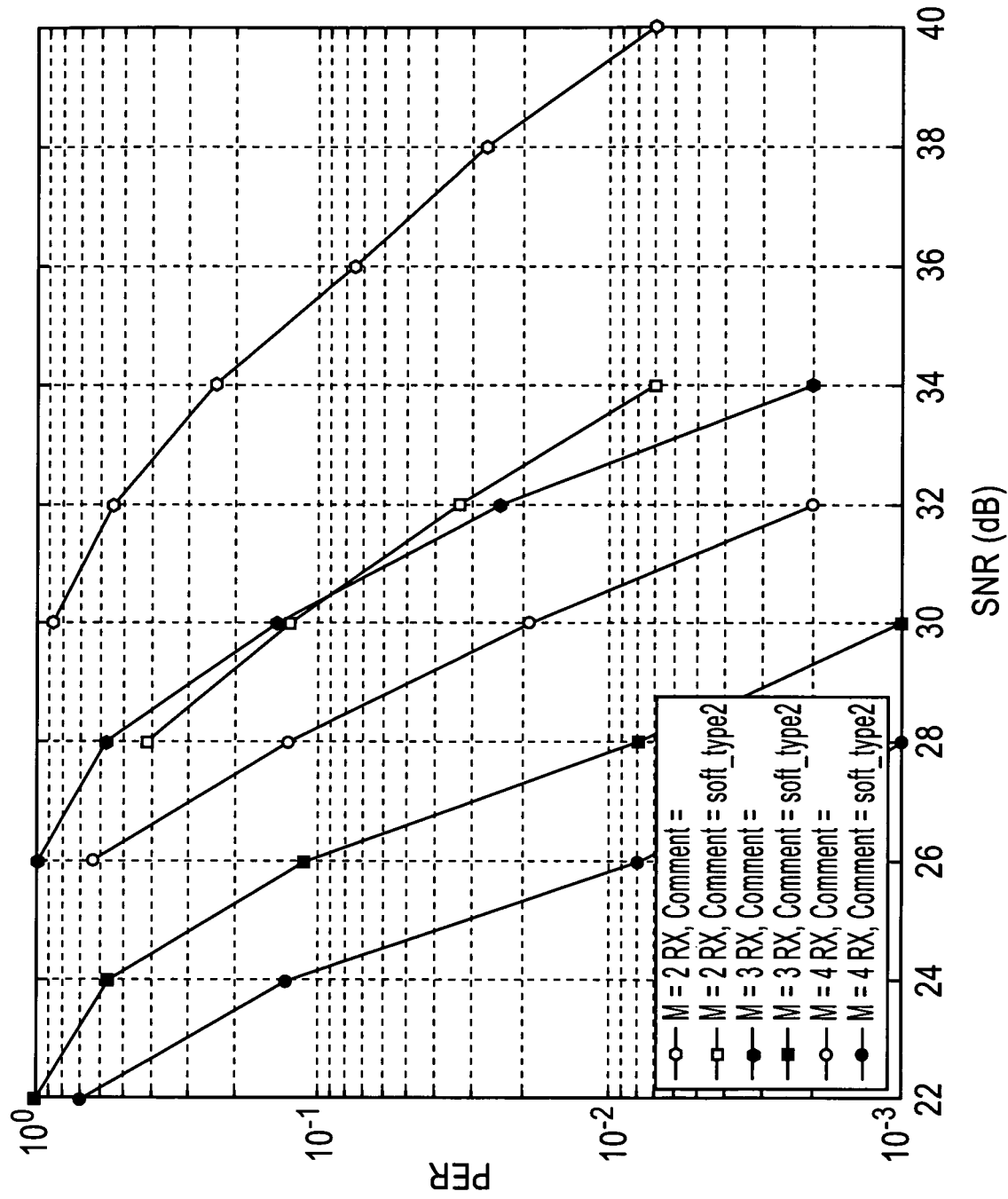
FIG. 5 provides simulation data showing differences between hard and soft decisions in STBC in another channel, according to one embodiment of the present invention.
Figure 6:
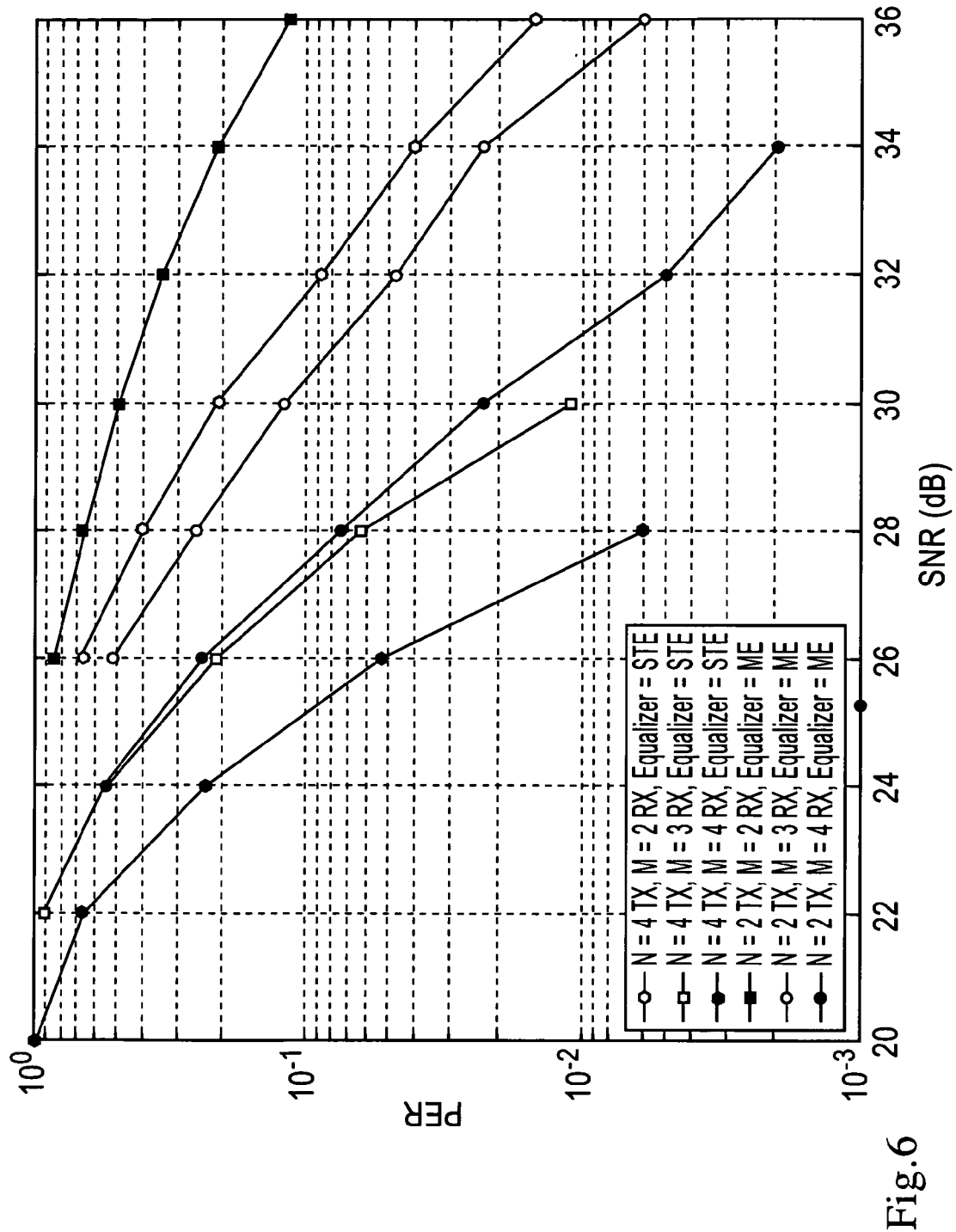
FIG. 6 provides simulation data showing differences between STBC coding and a minimum mean square error (MMSE) for channels with delay spread of 15 ns, according to one embodiment of the present invention.
Figure 7:
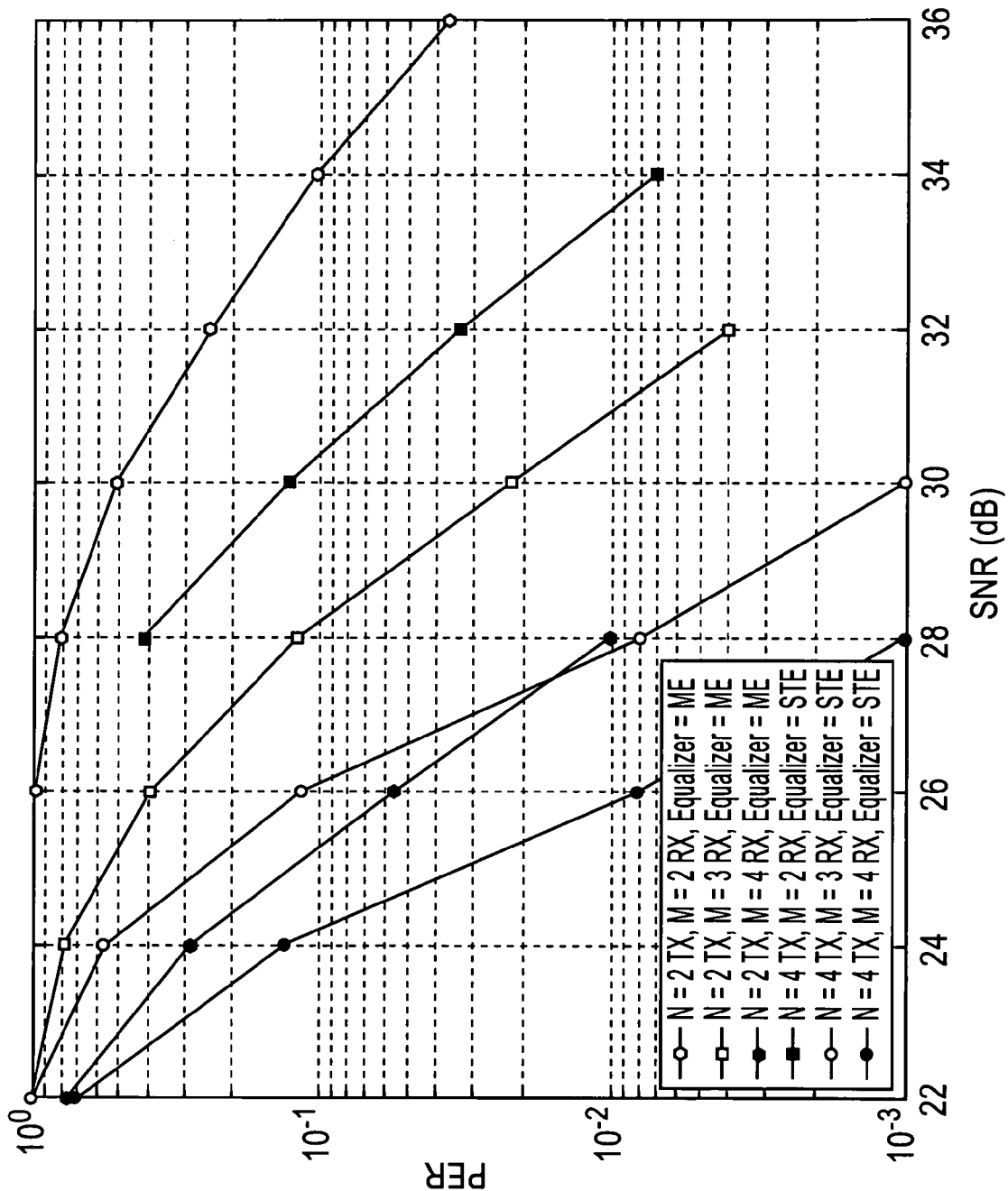
FIG. 7 provides simulation data showing differences between STBC coding and a minimum mean square error (MMSE) in channels with delay spread of 50 ns, according to one embodiment of the present invention.
Figure 8:
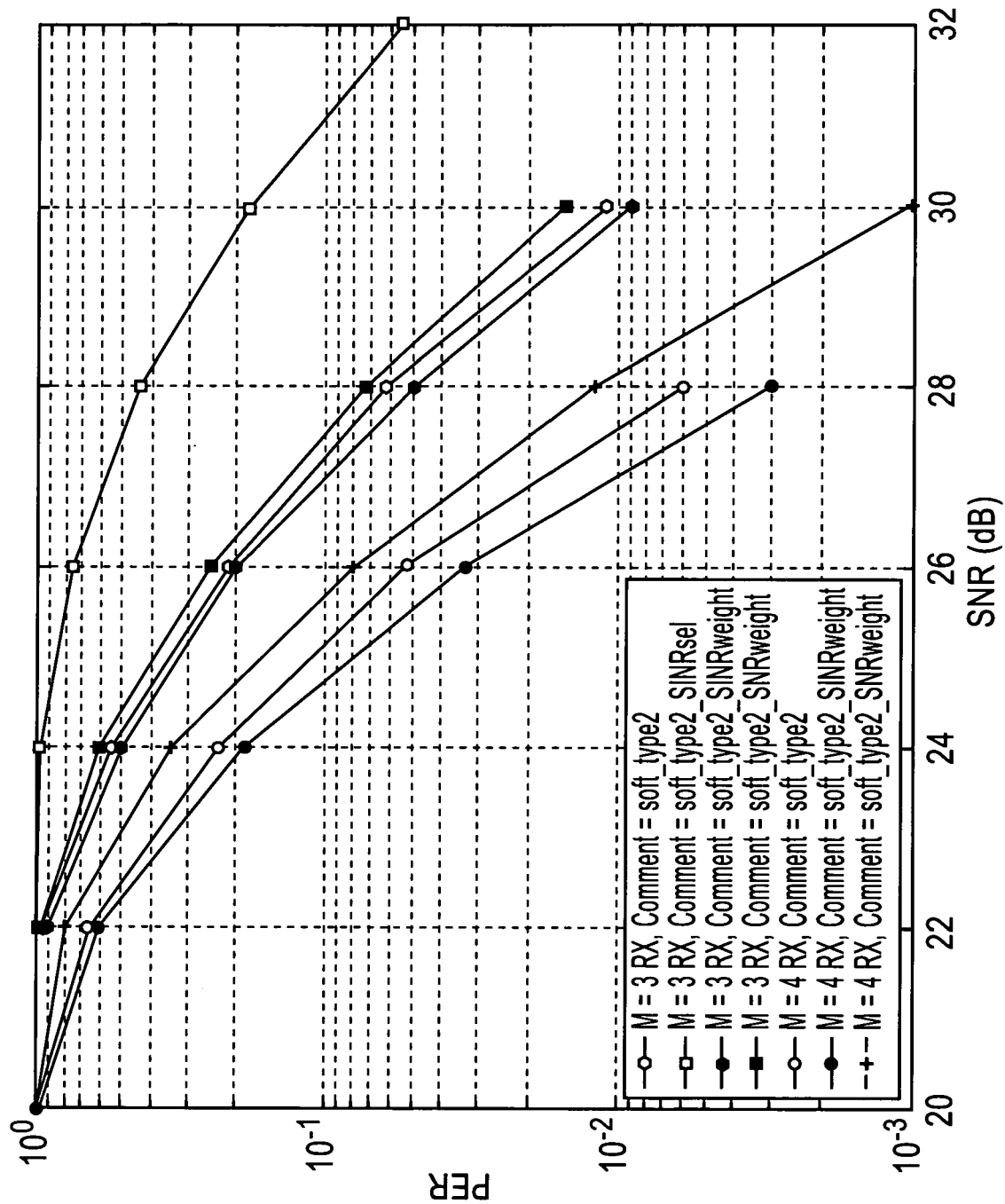
FIG. 8 provides simulation data showing differences between STBC coding utilizing different weights, according to one embodiment of the present invention.
Figure 9:
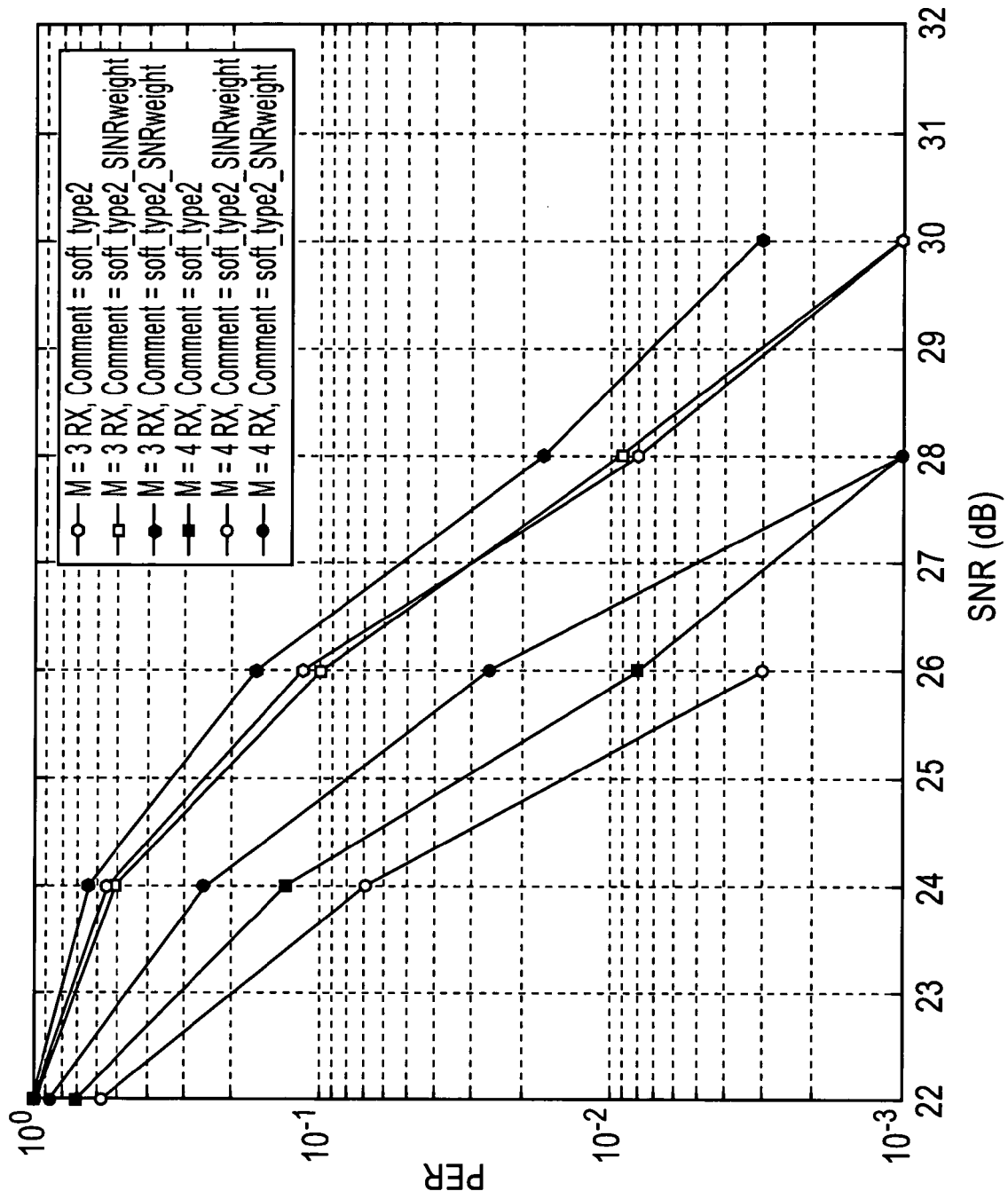
FIG. 9 provides simulation data showing differences between STBC coding utilizing different weights in channels with delay spread of 50 ns, according to one embodiment of the present invention.

FIGS. 4-9 provide simulation results illustrating benefits of the instant invention. FIGS. 4 and 5 provide responses showing differences between hard and soft decisions in STBC. The results assume 4 transmitting antennas, at a frequency of 5 GHz, having a bandwidth of 20 MHz, operating under IEEE 802.11n, for two, three and four receive antennas at a distance of approximately 15 meters. FIGS. 6 and 7 provide similar results, under similar conditions as set for FIGS. 4 and 5, showing differences between STBC coding and a minimum mean square error (MMSE). FIGS. 8 and 9 provides similar results, showing differences between STBC coding utilizing different weights.

Accordingly, STBC works better than MMSE up to 3 dB at PER of 10%, where the gain comes from transmission diversity. This gap is slightly bigger for soft decision, as illustrated in the results discussed above. STBC with soft decision outperforms STBC with hard decision up to 5 dB at PER of 10%, as illustrated in FIGS. 4 and 5. STBC with soft decision with N=2, M=4 achieves 10% PER at SNR of 25 dB for 802.11n channel model B. STBC with SINR weight performs better (up to 1 dB) than any other weights when M>N.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

Figure 10:
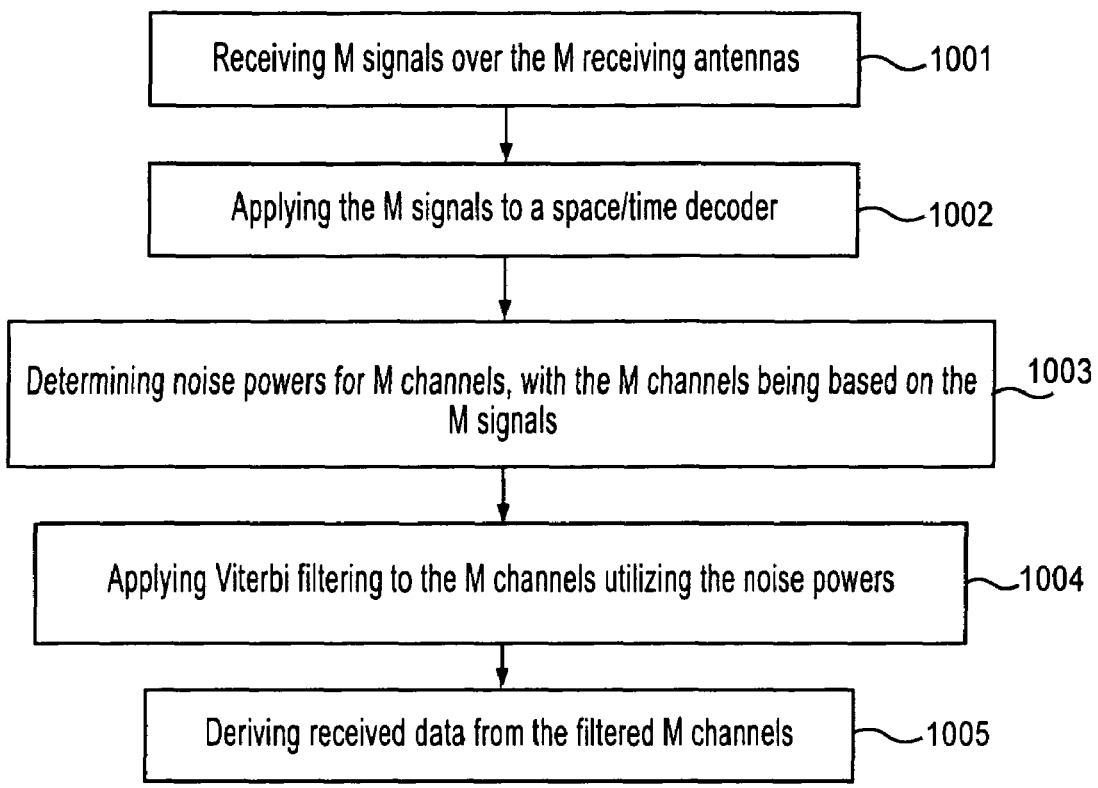
FIGS. 10 and 11 illustrate flow diagrams according to example embodiments of the present inventive concept.
Figure 11:
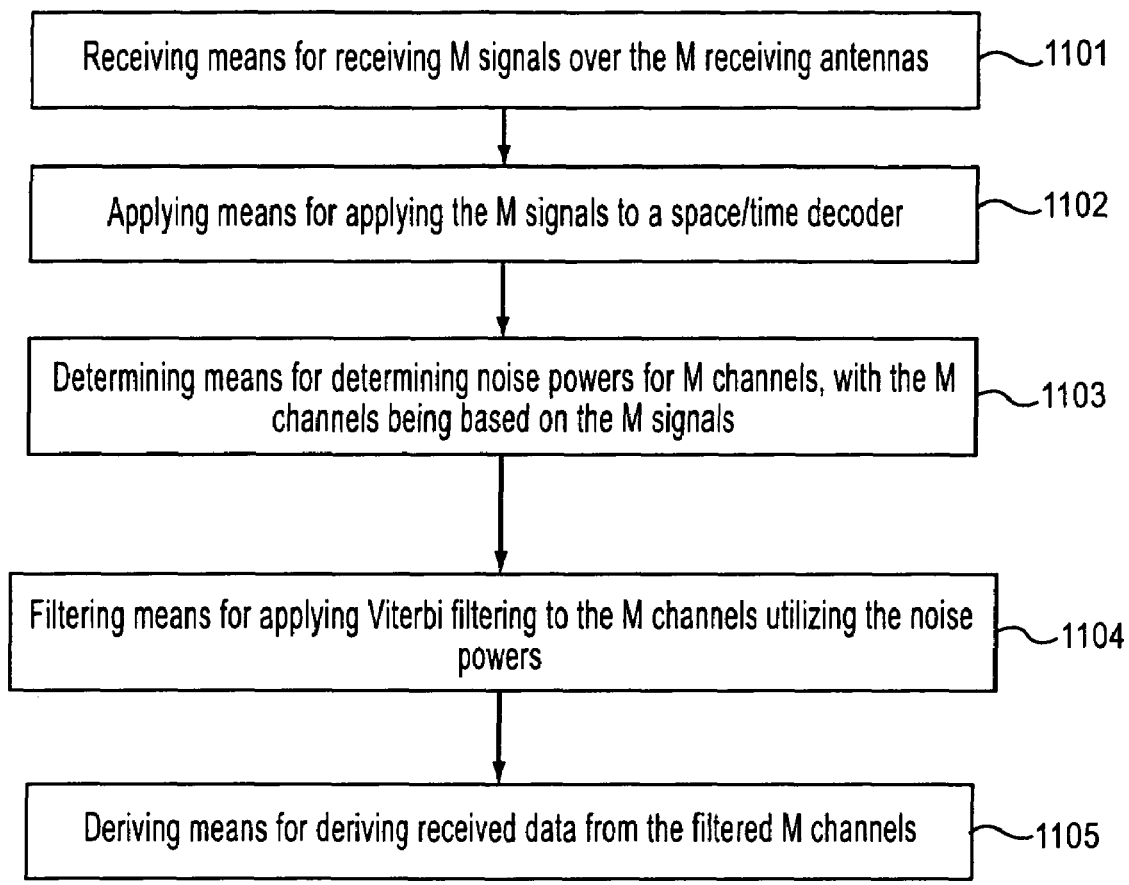

FIGS. 10 and 11 illustrate example embodiments of the inventive concept. FIG. 10 illustrates a method that includes receiving M signals over the M receiving antennas (operation 1001), applying the M signals to a space/time decoder (operation 1002), determining noise powers for M channels, with the M channels being based on the M signals (operation 1003), applying Viterbi filtering to the M channels utilizing the noise powers (operation 1004) and deriving received data from the filtered M channels (operation 1005). FIG. 11 illustrates a method that includes receiving means for receiving M signals over the M receiving antennas (operation 1101), applying means for applying the M signals to a space/time decoder (operation 1102), determining means for determining noise powers for M channels, with the M channels being based on the M signals (operation 1103), filtering means for applying Viterbi filtering to the M channels utilizing the noise powers (operation 1004), and deriving means for deriving received data from the filtered M channels (operation 1105).

What is claimed is:

1. A method of receiving data over N receiving antennas from M transmitting antennas, where M and N are integers, the method comprising the steps of:
   receiving N signals over the N receiving antennas;
   applying the N signals to a space/time decoder;
   determining noise powers for N channels, with the N channels being based on the N signals, said noise power determination being based on N combinations of noise power scaling;
   applying Viterbi filtering to the N channels utilizing the noise powers; and
   deriving received data from the filtered N channels.

2. A method according to claim 1, wherein the step of determining noise powers further comprises removing interference terms between the N channels.

3. A method according to claim 1, wherein the step of determining noise powers comprises zero-forcing terms equivalent to relationships between signals sent from the M transmitting antennas to the N receiving antennas to determine channel information.

4. A method according to claim 3, wherein when N=2, the relationships comprise:

$$\begin{bmatrix} r_1 \\ r_2 \end{bmatrix} = \begin{bmatrix} H_1 & G_1 \\ H_2 & G_2 \end{bmatrix} \begin{bmatrix} c_1 \\ c_2 \end{bmatrix} + \begin{bmatrix} n_1 \\ n_2 \end{bmatrix} \quad \text{where,}$$

$$c_1 = \begin{bmatrix} c_{11} \\ c_{12} \end{bmatrix}, \quad c_2 = \begin{bmatrix} c_{21} \\ c_{22} \end{bmatrix}, \quad r_1 = \begin{bmatrix} r_1(t_1) \\ r_1^*(t_2) \end{bmatrix}, \quad r_2 = \begin{bmatrix} r_2(t_1) \\ r_2^*(t_2) \end{bmatrix},$$

$$H_i = \begin{bmatrix} h_{1i} & h_{2i} \\ h_{2i}^* & -h_{1i}^* \end{bmatrix}, \quad G_i = \begin{bmatrix} h_{3i} & h_{4i} \\ h_{4i}^* & -h_{3i}^* \end{bmatrix}$$

and the channel information of each space-time block-coding (STBC) symbol after crosstalk cancellation, Ni, comprises:

$$E\left( \begin{bmatrix} N_1 \\ N_2 \end{bmatrix} \begin{bmatrix} N_1^* & N_2^* \end{bmatrix} \right) = \begin{bmatrix} \tilde{H}^*(I+\hat{G})\tilde{H} & -\tilde{H}^*((H_2 H_1^{-1})^* + G_1 G_2^{-1})\tilde{H} \\ \tilde{G}^*(H_1 H_1^{-1} + (G_1 G_2^{-1})^*)\tilde{H} & \tilde{G}^*(I+\hat{H})\tilde{G} \end{bmatrix}$$

where, $\hat{G} = G_1 (G_2^* G_2)^{-1} G_1^*$, $\hat{H} = H_2 (H_1^* H_1)^{-1} H_2^*$, and where, $\tilde{H} = H_1 - G_1 G_2^{-1} H_2$, $\tilde{G} = G_2 - H_2 H_1^{-1} G_1$.

5. A method according to claim 4, wherein when N is greater than M, the channel information can be written as sums of weighted scalar values.

6. A method according to claim 1, wherein the step of receiving N signals comprises receiving the N signals that have been coded through space-time block-coding.

7. A method according to claim 1, wherein the step of applying Viterbi filtering to the N channels comprises applying soft decision Viterbi filtering to the N channels.

8. A method according to claim 1, further comprising utilizing the noise powers in decoding of the N channels, wherein the decoding is performed according to one of turbo decoding and low density parity check block decoding.

9. A method according to claim 1, further comprising at least one of band pass filtering of the N received signals, analog-to-digital converting of the N received signals, fast Fourier transforming the N Viterbi filtered channels and multiplexing the N Viterbi filtered channels.

10. A receiver for receiving data over N receiving antennas transmitted from M transmitting antennas, where N and M are integers, the receiver comprising:

receiving means for receiving N signals over the N receiving antennas;

applying means for applying the N signals to a space/time decoder;

determining means for determining noise powers for N channels, with the N channels being based on the N signals, said noise power determining means being based on N combinations of noise power scaling;

filtering means for applying Viterbi filtering to the N channels utilizing the noise powers; and deriving means for deriving received data from the filtered N channels.

11. A receiver according to claim 10, wherein the determining means further comprises interference removing means for removing interference terms between the N channels.

12. A receiver according to claim 10, wherein the determining means comprises zero-forcing means for zero-forcing terms equivalent to relationships between signals sent from the M transmitting antennas to the N receiving antennas to determine channel information.

13. A receiver according to claim 12, wherein the relationships comprise:

$$\begin{bmatrix} r_1 \\ r_2 \end{bmatrix} = \begin{bmatrix} H_1 & G_1 \\ H_2 & G_2 \end{bmatrix} \begin{bmatrix} c_1 \\ c_2 \end{bmatrix} + \begin{bmatrix} n_1 \\ n_2 \end{bmatrix} \quad \text{where,}$$

$$c_1 = \begin{bmatrix} c_{11} \\ c_{12} \end{bmatrix}, \quad c_2 = \begin{bmatrix} c_{21} \\ c_{22} \end{bmatrix}, \quad r_1 = \begin{bmatrix} r_1(t_1) \\ r_1^*(t_2) \end{bmatrix}, \quad r_2 = \begin{bmatrix} r_2(t_1) \\ r_2^*(t_2) \end{bmatrix},$$

$$H_i = \begin{bmatrix} h_{1i} & h_{2i} \\ h_{2i}^* & -h_{1i}^* \end{bmatrix}, \quad G_i = \begin{bmatrix} h_{3i} & h_{4i} \\ h_{4i}^* & -h_{3i}^* \end{bmatrix}$$

and the channel information of each STBC symbol after crosstalk cancellation, Ni, comprises:

$$E\left( \begin{bmatrix} N_1 \\ N_2 \end{bmatrix} \begin{bmatrix} N_1^* & N_2^* \end{bmatrix} \right) = \begin{bmatrix} \tilde{H}^*(I+\hat{G})\tilde{H} & -\tilde{H}^*((H_2 H_1^{-1})^* + G_1 G_2^{-1})\tilde{H} \\ \tilde{G}^*(H_1 H_1^{-1} + (G_1 G_2^{-1})^*)\tilde{H} & \tilde{G}^*(I+\hat{H})\tilde{G} \end{bmatrix}$$

where, $\hat{G} = G_1 (G_2^* G_2)^{-1} G_1^*$, $\hat{H} = H_2 (H_1^* H_1)^{-1} H_2^*$, and where $\tilde{H} = H_1 - G_1 G_2^{-1} H_2$, $\tilde{G} = G_2 - H_2 H_1^{-1} G_1$.

14. A receiver according to claim 13, wherein when N is greater than M, the channel information can be written as sums of weighted scalar values.

15. A receiver according to claim 10, wherein the receiving means comprises receiving means for receiving the N signals that have been coded through space-time block-coding.

16. A receiver according to claim 10, wherein the applying means comprises applying means for applying soft decision Viterbi filtering to the N channels.

17. A receiver according to claim 10, further comprising utilizing means for utilizing the noise powers in decoding of the N channels, wherein the decoding is performed according to one of turbo decoding and low density parity check block decoding.

18. A receiver according to claim 10, further comprising at least one of band pass filtering means for filtering of the N received signals, analog-to-digital converting means for analog-to-digital converting of the N received signals, fast Fourier transforming means for fast Fourier transforming the N Viterbi filtered channels and multiplexing means for multiplexing the N Viterbi filtered channels.

19. A receiver for receiving data over N receiving antennas transmitted from M transmitting antennas, where N and M are integers, the receiver comprising:

N receiving antennas, configured to receive N signals;

a space/time decoder, configured to receive the N signals and supply N channels being based on the N signals; and a multiplexer, configured to provide received data from the N channels;

wherein the space/time decoder is configured to determine noise powers for N channels and to apply Viterbi filtering to the N channels utilizing the noise powers, said noise power determination being based on N combinations of noise power scaling.

20. A receiver according to claim 19, wherein the space/time decoder is configured to remove interference terms between the N channels.

21. A receiver according to claim 19, wherein the space/time decoder is configured to zero-force terms equivalent to relationships between signals sent from the M transmitting antennas to the N receiving antennas to determine channel information.

22. A receiver according to claim 21, wherein the relationships comprise:

$$\begin{bmatrix} r_1 \\ r_2 \end{bmatrix} = \begin{bmatrix} H_1 & G_1 \\ H_2 & G_2 \end{bmatrix} \begin{bmatrix} c_1 \\ c_2 \end{bmatrix} + \begin{bmatrix} n_1 \\ n_2 \end{bmatrix} \text{ where,}$$

$$c_1 = \begin{bmatrix} c_{11} \\ c_{12} \end{bmatrix}, c_2 = \begin{bmatrix} c_{21} \\ c_{22} \end{bmatrix}, r_1 = \begin{bmatrix} r_1(t_1) \\ r_1^*(t_2) \end{bmatrix}, r_2 = \begin{bmatrix} r_2(t_1) \\ r_2^*(t_2) \end{bmatrix},$$

$$H_i = \begin{bmatrix} h_{1i} & h_{2i} \\ h_{2i}^* & -h_{1i}^* \end{bmatrix}, G_i = \begin{bmatrix} h_{3i} & h_{4i} \\ h_{4i}^* & -h_{3i}^* \end{bmatrix}$$

and the channel information of each STBC symbol after crosstalk cancellation, Ni, comprises:

$$E\left(\begin{bmatrix} N_1 \\ N_2 \end{bmatrix} \begin{bmatrix} N_1^* & N_2^* \end{bmatrix}\right) = \begin{bmatrix} \tilde{H}^*(I+\hat{G})\tilde{H} & -\tilde{H}^*((H_2 H_1^{-1})^* + G_1 G_2^{-1})\tilde{H} \\ \tilde{G}^*(H_1 H_1^{-1} + (G_1 G_2^{-1})^*)\tilde{H} & \tilde{G}^*(I+\hat{H})\tilde{G} \end{bmatrix}$$

where, $\hat{G} = G_1(G_2^* G_2)^{-1} G_1^*$, $\hat{H} = H_2(H_1^* H_1)^{-1} H_2^*$, and where $\tilde{H} = H_1 - G_1 G_2^{-1} H_2$, $\tilde{G} = G_2 - H_2 H_1^{-1} G_1$.

23. A receiver according to claim 22, wherein when N is greater than M, the channel information can be written as sums of weighted scalar values.

24. A receiver according to claim 19, wherein the space/time decoder is configured to apply soft decision Viterbi filtering to the N channels.

25. A receiver according to claim 19, wherein the space/time decoder is configured to utilize the noise powers in decoding of the N channels, wherein the decoding is configured to perform according to one of turbo decoding and low density parity check block decoding.

26. A receiver method according to claim 19, further comprising at least one of a band pass filter, an analog-to-digital converter, a fast Fourier transformer and a multiplexer.

* * * * *

UNITED STATES PATENT AND TRADEMARK OFFICE
CERTIFICATE OF CORRECTION

PATENT NO. : 7,519,126 B2
APPLICATION NO. : 10/953366
DATED : April 14, 2009
INVENTOR(S) : Joonsuk Kim It is certified that error appears in the above-identified patent and that said Letters Patent is hereby corrected as shown below:

In Column 12, line 43 – after "receiver" delete "method".

Signed and Sealed this

Thirteenth Day of October, 2009

David J. Kappos
*Director of the United States Patent and Trademark Office*